US011015006B2

(12) United States Patent
Leidinger et al.

(10) Patent No.: US 11,015,006 B2
(45) Date of Patent: May 25, 2021

(54) COATED POLYMER PARTICLES COMPRISING A WATER-SWELLABLE POLYMER CORE AND A SOL-GEL COATING

(71) Applicant: BASF SE, Ludwigshafen am Rhein (DE)

(72) Inventors: Peter Leidinger, Ludwigshafen (DE); Piotr Antoni Bazula, Mannheim (DE); Holger Misslitz, Trostberg (DE); Gregor Herth, Trostberg (DE); Stefan Friedrich, Trostberg (DE); Maik Schlesinger, Ludwigshafen (DE)

(73) Assignee: BASF SE

( * ) Notice: Subject to any disclaimer, the term of this patent is extended or adjusted under 35 U.S.C. 154(b) by 102 days.

(21) Appl. No.: 16/093,364

(22) PCT Filed: Apr. 5, 2017

(86) PCT No.: PCT/EP2017/058115
§ 371 (c)(1),
(2) Date: Oct. 12, 2018

(87) PCT Pub. No.: WO2017/178302
PCT Pub. Date: Oct. 19, 2017

(65) Prior Publication Data
US 2019/0211127 A1 Jul. 11, 2019

(30) Foreign Application Priority Data

Apr. 14, 2016 (EP) .................................... 16165337

(51) Int. Cl.
| | |
|---|---|
| C08F 220/48 | (2006.01) |
| C04B 20/10 | (2006.01) |
| C09K 8/588 | (2006.01) |
| C08J 3/12 | (2006.01) |
| C09K 8/487 | (2006.01) |
| C09K 8/467 | (2006.01) |
| C08F 220/56 | (2006.01) |
| C04B 24/16 | (2006.01) |
| C09K 8/508 | (2006.01) |
| C09K 8/516 | (2006.01) |
| C04B 111/20 | (2006.01) |
| C04B 103/00 | (2006.01) |
| C08J 7/06 | (2006.01) |

(52) U.S. Cl.
CPC ........ *C08F 220/48* (2013.01); *C04B 20/1066* (2013.01); *C04B 20/1074* (2013.01); *C04B 24/163* (2013.01); *C08F 220/56* (2013.01); *C08J 3/128* (2013.01); *C08J 7/06* (2013.01); *C09K 8/467* (2013.01); *C09K 8/487* (2013.01); *C09K 8/5083* (2013.01); *C09K 8/516* (2013.01); *C09K 8/588* (2013.01); *C04B 2103/0049* (2013.01); *C04B 2111/29* (2013.01); *C08F 2800/10* (2013.01); *C08J 2300/14* (2013.01); *C08J 2333/20* (2013.01); *C08J 2333/26* (2013.01)

(58) Field of Classification Search
None
See application file for complete search history.

(56) References Cited

U.S. PATENT DOCUMENTS

| | | | |
|---|---|---|---|
| 4,857,610 A | 8/1989 | Chmelir et al. | |
| 2005/0005869 A1 | 1/2005 | Fritter et al. | |
| 2008/0108524 A1 | 5/2008 | Willberg et al. | |
| 2011/0095227 A1 | 4/2011 | Herth et al. | |
| 2011/0224361 A1* | 9/2011 | Daniel ........................ | C08J 3/12 |
| | | | 524/556 |
| 2012/0015852 A1* | 1/2012 | Quintero ................... | C09K 8/32 |
| | | | 507/112 |
| 2012/0157634 A1 | 6/2012 | Lopez Villanueva | |
| 2015/0114648 A1* | 4/2015 | Mirakyan ................ | C09K 8/68 |
| | | | 166/305.1 |
| 2015/0132479 A1 | 5/2015 | Arfsten et al. | |
| 2015/0132564 A1 | 5/2015 | Arfsten et al. | |
| 2015/0368549 A1 | 12/2015 | Willberg et al. | |
| 2016/0137904 A1* | 5/2016 | Drake .................... | C09K 8/524 |
| | | | 507/219 |

FOREIGN PATENT DOCUMENTS

| | | | |
|---|---|---|---|
| WO | WO 98/16308 A1 | 4/1998 | |
| WO | WO 2005/087181 A2 | 9/2005 | |
| WO | WO 2009/156229 A2 | 12/2009 | |
| WO | WO 2010/057912 A1 | 5/2010 | |
| WO | WO 2011/023536 A1 | 3/2011 | |
| WO | WO 201 3/1 74 75 | 11/2013 | |
| WO | WO 2015/083999 A1 | 6/2015 | |

OTHER PUBLICATIONS

International Search Report dated Jun. 12, 2017, in PCT/EP2017/058115, filed Apr. 5, 2017.

\* cited by examiner

*Primary Examiner* — John J Figueroa
(74) *Attorney, Agent, or Firm* — Faegre Drinker Biddle & Reath LLP (57) ABSTRACT

The present invention relates to coated polymer particles comprising a water-swellable polymer core and an essentially continuous coating encapsulating the core. The coating comprises an oxide, hydroxide or oxide hydrate of silicon, aluminum, zirconium, tin or titanium. The polymer particles do not show instantaneous swelling, when contacted with water or a water-containing liquid, but show delayed water absorption after an appropriate period of time. The coated polymer particles may be used in oil fields, in mining, for construction chemical compositions or as carrier for active substances. The coated polymer particles are prepared by a suspension coating process or a fluidized bed coating process.

19 Claims, 3 Drawing Sheets

COATED POLYMER PARTICLES COMPRISING A WATER-SWELLABLE POLYMER CORE AND A SOL-GEL COATING

The present invention relates to coated polymer particles comprising a water-swellable polymer core and an essentially continuous coating encapsulating the core, a process for preparing said coated polymer particles and the use of the coated polymer particles in mining, for construction chemical compositions or as carrier for active substances.

Superabsorbents are polymers that are able to absorb fluids, such as water or water-containing fluids, in quantities corresponding to many times of their own weight. They are also able to retain the fluid absorbed, even when subjected to external pressure. Such polymers have found wide use in, for example, absorbent sanitary products such as diapers, sanitary napkins and the like, and are characterized by immediate fluid absorption, when getting in contact with water-containing fluids. Among the superabsorbents also salt insensitive superabsorbents (SISA) have been prepared (for instance by gel polymerization) and are commercially available. Said SISA are for example used as additives for construction chemical compositions. Similarly to the above-mentioned ordinary superabsorbents, the known SISA also exhibit instantaneous water absorption, when getting in contact with water or water-containing fluids. However, instantaneous swelling is not desirable for particular applications, for example, when water absorption shall not take place until the superabsorbents or compositions comprising superabsorbents have been placed at its appropriate destination for use. This is for example of relevance for applications in mining, for use in construction chemical compositions or for carriers for active substances.

WO 98/16308 A1 describes composite materials comprising water-swellable polymer gels and inorganic, electroneutral materials. Also core-shell systems are described which are obtained by using a water soluble and a water insoluble crosslinking agent. This results in a product that is crosslinked throughout the particle and additionally crosslinked at the surface.

WO 2005/087181 A2 describes cosmetic formulations comprising a suspension product for reducing wetness under the arm which comprises a superabsorbent polymer, a sesquiterpene, zinc oxide and a volatile silicone. If the formulation is in the form of a roll-on or pump spray, it may additionally comprise colloidal silica as a suspending agent.

US 2008/0108524 A1 describes a water absorbing composition comprising a core of a water-swellable material and a coating surrounding the core that temporarily prevents contact of water with the water-swellable material. The coating may include a water-degradable material, for instance polylactic acid, and a non-water-degradable material, which does not include mineral oxide materials, but may include natural gums, polysaccharides, cellulose or proteins. Said non-water-degradable material may be removed by mechanical breakage or degrading in liquids different from water.

US 2005/0005869 A1 describes composite materials comprising an absorbent material, for example a mineral, in the form of a particle and a performance-enhancing active, for example antimicrobials or odor absorbers or inhibitors. The active may be arranged in a layer on the surface of the particle.

WO 2011/023536 A1 describes particulate superabsorbents that may be post-crosslinked by, for example, alkoxysilyl compounds. Polyvalent metal salts or inorganic fine particles such as colloidal silicic acid sols may be applied to the surface of the particulate superabsorbents in order to improve liquid conductivity. Post-crosslinking occurs at the surface of the particulate superabsorbent without formation of an additional layer. The inorganic fine particles, which are for example applied by spraying, are included in the superabsorbent polymer matrix by physisorption. The inorganic fine particles form isolated islands on the surface of the particulate superabsorbent and do not congeal to a continuous coating.

WO 2013/174753 relates to a method of making hybrid organic-inorganic core-shell nano-particles, comprising the steps of a) providing colloidal organic particles comprising a synthetic polyampholyte as a template; b) adding at least one inorganic oxide precursor such as tetraethoxy silane; and c) forming a shell layer from the precursor on the template to result in core-shell nano-particles. The colloidal organic template particles have an average particle size in the range of 10 to 300 nm. The calculated mass ratios of $SiO_2$ to polyampholyte range from 1.39 to 2.5. Aqueous dispersions of the core-shell nano-particles are found to show remarkably good storage and handling stability, meaning the dispersion shows little tendency to changing viscosity or gelling.

The problem underlying the invention was to provide water-swellable polymer particles that do not show instantaneous swelling, when getting in contact with water or a water-containing liquid, but show delayed water absorption after an appropriate period of time.

The above problem has been solved by coated polymer particles comprising
(a) a water-swellable polymer core, the water-swellable polymer core comprising a copolymer comprising sulfo group-containing and/or quaternary ammonium group-containing structural units, and
(b) an essentially continuous coating encapsulating the core, the coating comprising oxides, hydroxides or oxide hydrates of silicon, aluminum, zirconium, tin or titanium or mixtures thereof,
wherein the mass ratio of the coating, calculated as oxide(s), to the water-swellable polymer core is from 0.002 to less than 1.

The term "water-swellable polymer" as used herein means that the polymer is capable of absorbing water or aqueous salt solutions. Typically, the water-swellable polymer is able to absorb many times their own weight of liquid. The absorption capacity is defined as the ratio of the amount (in g) of absorbed liquid to the mass (in g) of dry polymer. It is determined according to norm EDANA 440.2-02 which is modified by using a 1% by weight aqueous calcium formate solution instead of the 0.9% by weight sodium chloride solution. The absorption capacity of the polymer is in general in the range from 5 to 50 g/g, preferably 5 to 30 g/g.

An essentially continuous coating is grown on the water-swellable polymer cores via polycondensation of a condensable precursor or a hydrolysable and condensable precursor. The water-swellable polymer core is completely encapsulated by the essentially continuous coating. The coating comprises oxides, hydroxides or oxide hydrates of silicon, aluminum, zirconium, tin or titanium or mixtures thereof. The coating of an individual coated particle is seamlessly bonded and/or crosslinked by covalent bonds. The term "seamlessly bonded and/or crosslinked" means that enough covalent bonds within the coating are provided, to obtain an essentially continuous coating surrounding the core. The coating fully covers the surface of the polymer core and preferably does not show imperfections or uncovered areas.

The mass ratio of the coating, calculated as oxide(s), to the (anhydrous) water-swellable polymer core is from 0.002 to less than 1, preferably from 0.02 to 0.85. The mass of the coating is calculated as oxide(s), i.e., the theoretically possible state of maximal condensation of the precursor. For example, if tetraethoxy silane is used as a precursor, it is assumed for the calculation that the tetraethoxy silane is fully converted to $SiO_2$.

Additionally, covalent bonds between the polymer core and the coating may be established by condensation reactions of functional groups of the polymer core with precursors for the coating as defined above. Said functional groups may for example comprise carboxylic acid groups and/or hydroxyl groups and/or amino groups.

In one embodiment, the coating comprises silicon dioxide, aluminum oxide, zirconium oxide, hydroxyaluminum oxide, tin oxide, titanium dioxide or tin oxide, or mixtures thereof.

In a further embodiment, the coating comprises oxides of silicon, aluminum and zirconium.

In another embodiment, the coating comprises essentially oxides of silicon.

In one embodiment, the coated polymer particles have a number average diameter in a range of from 10 to 1000 µm, preferably 50 to 500 µm. The average diameter was determined by electron microscopy.

In one embodiment, the average layer thickness of the coating is in a range of from 100 to 1000 nm, preferably 250 nm to 700 nm, more preferably 300 nm to 600 nm. The average layer thickness was determined by electron microscopy (SEM: Jeol 7500-TFE (Jeol Ltd., Tokyo, Japan), operated at 5 kV, secondary electron (SE) detector; TEM: Transmission Electron Microscopy (TEM): Tecnai G2-F20ST machine (FEI Company, Hillsboro, USA) operated at 200 keV.

In one embodiment, the coated polymer particles are essentially spherical particles and have an average sphericity (mSPHT) of at least 0.90, preferably of at least 0.95, more preferably of at least 0.99. Sphericity (SPHT) is defined as $SPHT=4\pi A/U^2$, wherein A represents the cross-sectional area of the particles and U represents the cross-sectional circumference of the particles. The average sphericity may be determined by an image analysis system like Camsizer® (Retsch Technology GmbH; Haan; Germany).

The coating temporarily prevents the contact of water or aqueous fluids with the polymer core. Temporarily preventing the contact of encompassing water with the polymer core for example refers to a time period of at least 5 min, preferably of at least 15 min, more preferably of at least 60 min, in particular of at least 100 min, wherein the water absorbing polymer does not get in contact with water or aqueous fluids surrounding the polymer particles. The time for water or aqueous fluids to come into contact with the water absorbing core can be controlled by layer thickness. The thicker the layer, the longer the time until water or aqueous fluids diffuse through the layer.

The coated polymer particles of the invention additionally provide the advantageous feature that the coating may be removed after an appropriate or defined time by means of pH-adjustment or pressure. The coating is essentially stable at pH-values between 6 and 8. Above and below said pH-values the coating may be removed by hydrolysis.

Preferably, the water-swellable polymer is a so called salt-insensitive superabsorbent polymer (SISA). These polymers can withstand the high alkalinity and high salt load encountered in construction materials or geopolymers.

According to an embodiment, the water-swellable polymer comprises a copolymer P1 which comprises sulfo group-containing and amide group-containing structural units and/or a copolymer P2 which comprises quaternary ammonium group-containing and amide group-containing structural units.

According to a further embodiment, the copolymer P1 comprises
(i) sulfonic acid-containing structural units of formula (I)

wherein
$R^1$ represents hydrogen or methyl,
$R^2$, $R^3$ and $R^4$ independently of each other represent hydrogen, $C_1$-$C_6$-alkyl or $C_6$-$C_{14}$-aryl,
M represents hydrogen, a metal cation or an ammonium cation,
a represents 1 or 1/valency of the metal cation, preferably 2 or 1,
(ii) (meth)acrylamido-containing structural units of formula (II)

wherein
$R^1$ represents hydrogen or methyl,
$R^5$ and $R^6$ independently of each other represent hydrogen, $C_1$-$C_{20}$-alkyl, $C_5$-$C_8$-cycloalkyl or $C_6$-$C_{14}$-aryl, and
(iii) structural units derived from monomers having two or more ethylenically unsaturated vinyl groups, and
(iv) optionally structural units derived from monomers having one ethylenically unsaturated vinyl group, which structural units are different from structural units (i) and (ii).

According to a further embodiment, the copolymer P2 comprises
(i) cationic structural units of formula (III)

wherein
$R^1$ represents hydrogen or methyl,
$R^7$, $R^8$, $R^9$ and $R^{10}$ independently of each other represent hydrogen, $C_1$-$C_{20}$-alkyl, $C_5$-$C_8$-cycloalkyl or $C_6$-$C_{14}$-aryl,
m represents an integer of from 1 to 6,
X represents oxygen or N—$R^{10}$, $Y^-_a$ represents halogen, $C_1$-$C_4$-alkylsulfate, $C_1$-$C_4$-alkylsulfonate or sulfate, a represents ½ or 1, and (ii) (meth)acrylamido-containing structural units of formula (II)

wherein $R^1$ represents hydrogen or methyl, $R^5$ and $R^6$ independently of each other represent hydrogen, $C_1$-$C_{20}$-alkyl, $C_5$-$C_8$-cycloalkyl or $C_6$-$C_{14}$-aryl, and (iii) structural units derived from monomers having two or more ethylenically unsaturated vinyl groups, and (iv) optionally structural units derived from monomers having one ethylenically unsaturated vinyl group, which structural units are different from structural units (i) and (ii).

According to a further embodiment, the copolymer P1 comprises (i) 10 to 70 mol-% of structural units of formula (I), (ii) 29.99 to 89.99 mol-% structural units of formula (II), (iii) 0.01 to 1 mol-% of structural units derived from monomers having two or more ethylenically unsaturated vinyl groups, and (iv) 0 to 30 mol-% structural units derived from monomers having one ethylenically unsaturated vinyl group, wherein the components (i), (ii), (iii) and (iv) add up to 100 mol-%.

According to a further embodiment, the copolymer P2 comprises (i) 10 to 70 mol-% of structural units of formula (III), (ii) 29.99 to 89.99 mol-% structural units of formula (II), (iii) 0.01 to 1 mol-% of structural units derived from monomers having two or more ethylenically unsaturated vinyl groups, and (iv) 0 to 30 mol-% structural units derived from monomers having one ethylenically unsaturated vinyl group, wherein the components (i), (ii), (iii) and (iv) add up to 100 mol-%.

In one embodiment of the sulfonic acid-containing structural units according to formula (I), M represents a monovalent or divalent metal cation selected from alkali metals or alkaline earth metals, such as sodium, potassium, calcium or magnesium.

In another embodiment of the sulfonic acid-containing structural units according to formula (I), M represents an ammonium cation selected from protonated forms of primary, secondary or tertiary $C_1$-$C_{20}$ alkylamines, $C_1$-$C_{20}$ alkanolamines, $C_5$-$C_8$ cycloalkylamines and $C_6$-$C_{14}$ arylamines. Examples for such ammonium cations are the protonated forms of methylamine, dimethylamine, trimethylamine, ethanolamine, diethanolamine, triethanolamine, cyclohexylamine, dicyclohexylamine or phenylamine.

In one embodiment, $C_6$-$C_{14}$-aryl is phenyl or naphthyl, in particular phenyl. In another embodiment, $C_5$-$C_8$-cycloalkyl is pentyl or hexyl. In another embodiment, $R^2$ and $R^4$ are hydrogen, $R^3$ is hydrogen or straight or branched $C_1$-$C_6$-alkyl. In another embodiment, $R^7$, $R^8$ and $R^9$ are straight or branched $C_1$-$C_6$-alkyl. $R^{10}$ is hydrogen or straight or branched $C_1$-$C_6$-alkyl. In another embodiment, $R^5$ and $R^6$ in formulae I and II are hydrogen or straight or branched $C_1$-$C_6$-alkyl.

In one embodiment, the structural units according to formula (I) are derived from monomers selected from 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid, 2-acrylamido-2,4,4-trimethylpentanesulfonic acid, the corresponding alkali metal or alkaline earth metal salts of said acids and mixtures thereof. In a preferred embodiment the structural units according to formula (I) are derived from 2-acrylamido-2-methylpropanesulfonic acid, its sodium, potassium, calcium or magnesium salts or mixtures thereof.

In one embodiment, copolymer P1 comprises the sulfonic acid-containing structural units according to formula (I) in an amount of from 10 to 43 mol-%, preferably 10 to 40 mol-%, more preferably 10 to 37 mol-% and most preferred 15 to 30 mol-%.

In one embodiment, the (meth)acryl amido-containing structural units of formula (II) may be derived from monomers selected from acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide or N-tert.-butylacrylamide or mixtures thereof, preferably acrylamide, methacrylamide, N-methylacrylamide, N,N-dimethylacrylamide or mixtures thereof.

In one embodiment, copolymer P1 comprises the (meth)acrylamido-containing structural units of formula (II) in an amount of from 31 to 88.99 mol-%, preferably 39 to 86.99 mol-%, more preferably 42.92 to 84.99 mol-% and most preferred 54.95 to 79.99 mol-%.

In one embodiment, copolymer P1 comprises structural units iii) derived from monomers having two or more ethylenically unsaturated vinyl groups as crosslinking agents.

Examples for such monomers are (meth)acryl-functionalized monomers, such as 1,4-butanedioldiacrylate, 1,4-butanedioldimethacrylate, 1,3-butyleneglycoldiacrylate, 1,3-butyleneglycoldimeth-acrylate, diethyleneglycoldiacrylate, diethyleneglycoldimethacrylate, ethyleneglycoldimethacrylate, ethoxylated bisphenol-A-diacrylate, ethoxylated bisphenol-A-dimethacrylat, ethyleneglycoldimethacrylate, 1,6-hexanedioldiacrylate, 1,6-hexanedioldimethacrylate, neopentylglycoldimethacrylate, polyethyleneglycoldiacrylate, polyethyleneglycoldimethacrylate, triethyleneglycoldiacrylate, triethyleneglycoldimethacrylate, tripropyleneglycoldiacrylate, tetraethyleneglycoldiacrylate, tetraethyleneglycoldiacrylate, tetraethyleneglycoldimethacrylate, dipentaerythritolpentaacrylate, pentaerythritoltetraacrylate, pentaerythritoltriacrylate, trimethylolpropanetriacrylate, trimethyloltrimethacrylate, cyclopentadienediacrylate, tris(2-hydroxyethyl)isocyanuratetetraacrylate or tris(2-hydroxy)isocyanuratetrimethacrylate; monomers, such as divinylesters or diallylesters of polycarboxylic acids with two or more carboxylic acid groups, for example triallylterephthalate, diallylmaleate, diallylfumarate, trivinyltrimellitate, divinyladipate or diallylsuccinat; monomers with more than one (meth)acrylamido group, such as N,N'-methylenebisacrylamide or N,N'-methylenebismethacrylamide or monomers with more than one maleimide group, such as hexamethylenebismaleimide; monomers with more than one vinylether group, such as ethyleneglycoldivinylether, triethyleneglycoldivinylether or cyclohexanedioldivinylether; or the salts thereof. Further, allylamino- or allylammonium compounds with more than one allyl group, for example triallylamine or tetraallylammonium chloride, alkali metal or alkaline earth metal salts, or aromatic compounds such as divinyl benzene may be used.

Among above-mentioned monomers the methacryl-functionalized monomers, methacrylamido-functionalized and allylamino-functionalized monomers and divinylbenzene are preferred. Particularly preferred are N,N'-methylenebisacrylamide, N,N'-methylenebismethacrylamide, triallylisocyanurate, triallylamine, tetraallylammonium chloride, alkali metal or alkaline earth metal salts or mixtures thereof.

In another embodiment, copolymer P1 comprises structural units iv) derived from monomers having one ethylenically unsaturated vinyl group. Hydrophilic monomers are preferred. Examples for such monomers are acrylnitrile, methacrylnitrile, vinylpyridine, vinylacetate, hydroxyethylacrylic acid, hydroxyethylmethacrylic acid, hydroxypropylacrylic acid, hydroxypropylmethacrylic acid, acrylic acid, methacrylic acid, ethacrylic acid, α-chloroacrylic acid, α-cyanoacrylic acid, β-methylacrylic acid, α-phenylacrylic acid, β-acryloxypropionic acid, sorbic acid, α-chloro sorbic acid, 2'-methyliso crotonic acid, cinnamic acid, maleic acid, maleic anhydride, p-chloro cinnamic acid, itaconic acid, citraconic acid, mesaconic acid, glutaconic acid, aconitic acid, fumaric acid, tricarboxyethylene, vinylsulfonic acid, allylsulfonic acid, styrenesulfonic acid, sulfoethylacrylate, sulfoethylmethacrylate, sulfopropylacrylate, sulfopropylmethacrylate, 2-hydroxy-3-methacryloxypropylsulfonic acid or mixtures thereof or the salts thereof. The (meth) acrylic monomers are preferred, in particular acrylic acid and methacrylic acid, and the salts thereof.

The crosslinking structural units iii) are, in general, present in an amount of 0.01 to 1 mol-%, more preferably in an amount of 0.01 to 0.08 mol-%, most preferred in an amount of 0.01 to 0.05 mol-%.

The structural units iv) are, in general, present in an amount of 0 to 30 mol-%. In one embodiment the structural units iv) are present in an amount of 1 to 25 mol-%, preferably in an amount of 3 to 20 mol-%, more preferably in an amount of 5 to 20 mol-% and most preferred in an amount of 5 to 15 mol-%.

In another embodiment copolymer P1 or P2 comprises the structural units i), ii), iii) and iv) in the following amounts:
Structural units i): 10-43 mol-%;
Structural units ii): 31-88.99 mol-%;
Structural units iii): 0.01-1 mol-%;
Structural units iv): 1-25 mol-%
Preferably:
Structural units i): 10-40 mol-%;
Structural units ii): 39-86.99 mol-%;
Structural units iii): 0.01-1 mol-%;
Structural units iv): 3-20 mol-%
More preferably:
Structural units i): 10-37 mol-%;
Structural units ii): 42.92-84.99 mol-%;
Structural units iii): 0.01-0.08 mol-%;
Structural units iv): 5-20 mol-%
Most preferred:
Structural units i): 15-30 mol-%;
Structural units ii): 54.95-79.99 mol-%;
Structural units iii): 0.01-0.05 mol-%;
Structural units iv): 5-15 mol-%
and any combinations thereof.

In one embodiment, copolymer P2 comprises structural units according to formula (III). Said structural units are for example derived from monomers such as [2-(acryloyloxy) ethyl]-trimethylammonium chloride, [2-(acryloyloxy)-ethyl]-trimethylammonium methosulfate, [2-(methacryloyloxy)-ethyl]-trimethylammonium chloride or-methosulfate, [3-(acryloylamino)-propyl]-trimethylammonium chloride or [3-(methacryloylamino)propyl]-trimethylammonium chloride or mixtures thereof. Among said monomers [3-(acryloylamino)-propyl]-trimethylammoniumchlorid and [3-(methacryloylamino)propyl]-trimethylammonium chloride are preferred.

In one embodiment, copolymer P2 comprises the structural units according to formula (III) in amount of from 15 to 70 mol-%, preferably 15 to 60 mol-%, more preferably 20 to 50 mol-%.

In one embodiment, copolymer P2 comprises structural units according to formula (II) as defined above and in the molar amounts as defined above.

In another embodiment, copolymer P2 comprises structural units iii) as defined above and in the molar amounts as defined above.

In yet another embodiment, copolymer P2 comprises structural units iv) as defined above and in the molar amounts as defined above.

In one embodiment, the water-swellable polymer core is represented by copolymer P1.

In another embodiment, the water-swellable polymer core is represented by copolymer P2.

In a further embodiment the water-swellable polymer core comprises a mixture of copolymers P1 and P2, preferably in a ratio of from 99/1 to 85/15 (mol-% P1/P2) or from 1/99 to 15/85 (mol-% P1/P2).

The water-swellable polymers comprising copolymer P1 and/or copolymer P2 may be prepared by polymerizing the monomers suitable for forming the structural units as defined above by means of free-radical polymerization. The monomers present as acids can be polymerized as free acids or in their salt form or in partially neutralized form. Neutralization or partial neutralization of the acids can also be effected after the polymerization. Suitable bases are, for example, sodium hydroxide, potassium hydroxide, calcium hydroxide, magnesium hydroxide or ammonia. Further suitable bases are primary, secondary or tertiary $C_1$-$C_{20}$-alkylamines, $C_1$-$C_{20}$-alkanolamines, $C_5$-$C_8$-cycloalkylamines or $C_6$-$C_{14}$-arylamines. It is possible to use one or more bases.

The monomers may, for example, be copolymerized by free-radical bulk, solution, gel, emulsion, dispersion or suspension polymerization. Polymerization in aqueous phase, polymerization in an inverted emulsion or polymerization in inverse suspension is preferred. In particularly preferred embodiments, the reaction is carried out as an inverse suspension polymerization in organic solvents.

The copolymerization may also be carried out as an adiabatic polymerization and be initiated either by means of a redox initiator system or by means of a photoinitiator. In addition, a combination of the two initiation variants is possible. The redox initiator system may consist of at least two components, an organic or inorganic oxidizing agent and an organic or inorganic reducing agent. Suitable are compounds having peroxide units, e.g. inorganic peroxides, such as alkali metal and ammonium persulfates, alkali metal and ammonium perphosphates, hydrogen peroxide and its salts (sodium peroxide, barium peroxide) or organic peroxides such as benzoyl peroxide, butyl hydroperoxide or peracids such as peracetic acid. Also suitable are oxidizing agents such as potassium permanganate, sodium and potassium chlorate, potassium dichromate, etc. As reducing agent, it is possible to use sulfur-containing compounds such as sulfites, thiosulfates, sulfinic acid, organic thiols (for example ethyl mercaptane, 2-hydroxyethanethiol, 2-mercaptoethylammonium chloride, thioglycolic acid) and others. Furthermore, ascorbic acid and low-valency metal salts of for example copper-(I), manganese-(II), or iron-(II) are suitable. It is also possible to use phosphorus compounds, for example sodium hypophosphite.

Photopolymerization is commonly initiated by means of UV light, which leads to the disintegration of a photoinitiator. As photoinitiators for example benzoin and benzoin derivatives such as benzoin ethers, benzil and its derivatives, e.g. benzil ketals, acryldiazonium salt, azo initiators such as 2,2'-azobis-(isobutyronitrile), 2,2'-azobis(2-amidinopropane) hydrochloride, and/or acetophenone derivatives are suitable.

The proportion by weight of the oxidizing component and the reducing component in the case of the redox initiator systems is in each case in the range of for example 0.00005 to 0.5% by weight, preferably 0.001 to 0.1% by weight. In the case of photoinitiators, this range is for example from 0.001 to 0.1% by weight, preferably from 0.002 to 0.05% by weight. The percentages by weight given for oxidizing and reducing component and photoinitiators are in each case based on the mass of the monomers used for the copolymerization.

The copolymerization may be carried out in aqueous solution, for example in concentrated aqueous solution, either batchwise in a polymerization vessel (batch process) or continuously by the "continuous conveyor belt" method as described in U.S. Pat. No. 4,857,610.

A further possibility is polymerization in a continuously or discontinuously operated kneading reactor. The process is usually initiated at a temperature of from −20 to 20° C., preferably from −10 to 10° C., and carried out at atmospheric pressure without external heating, with a maximum final temperature, which is dependent on the monomer content, of from 50 to 150° C., being obtained as a result of the heat of polymerization. After the copolymerization is complete, comminution of the polymer, which is present as a gel, may be carried out. If the copolymerization is carried out on a laboratory scale, the comminuted gel may be dried in a convection drying oven at from 70 to 180° C., preferably from 80 to 150° C. On an industrial scale, drying can also be carried out continuously in the same temperature ranges, for example on a belt dryer or in a fluidized-bed dryer.

In one embodiment, the copolymerization is carried out as an inverse suspension polymerization of the aqueous monomer phase in an organic solvent. Here, the monomer mixture, which has been dissolved in water and neutralized, if appropriate, is polymerized in the presence of an organic solvent, in which the aqueous monomer phase is insoluble or sparingly soluble. The copolymerization is for example carried out in the presence of "water-in-oil" emulsifiers (W/O emulsifiers) and/or protective colloids, which may be used in proportions of from 0.05 to 5% by weight, preferably from 0.1 to 3% by weight, based on the monomers. The W/O emulsifiers and protective colloids are also referred to as stabilizers. It is possible to use customary compounds known as stabilizers in inverse suspension polymerization technology, e.g. hydroxypropylcellulose, ethylcellulose, methylcellulose, mixed cellulose acetate butyrate ethers, copolymers of ethylene and vinyl acetate, copolymers of styrene and butyl acrylate, polyoxyethylenesorbitan monooleate, monolaurate or monostearate and block copolymers of propylene oxide and ethylene oxide.

Organic solvents used for inverse suspension polymerization are, for example, linear, branched or cyclic aliphatic hydrocarbons with 6 to 14 carbon atoms, and aromatic hydrocarbons such as benzene, toluene or xylene. Further suitable solvents are $C_1$-$C_{12}$-alcohols with one, two or more hydroxy groups. Preference is given to organic solvents which form azeotropic mixtures with water.

The water-swellable copolymers may initially be obtained in swollen form as finely dispersed droplets in an organic medium and may be isolated as solid particles in the organic medium by removal of water. Removal of the organic phase and drying leaves a pulverulent solid. Inverse suspension polymerization provides the advantage that the particle size distribution of the powders can be controlled and tailor-made polymer cores can be obtained by variation of the polymerization conditions (choice of monomers and cross-linkers, amount of cross-linkers, stirring speed during polymerization, amount of surfactants) and it is therefore usually possible to avoid an additional process step (milling step) for adjusting the particle size distribution. In one embodiment, the obtained polymer particles are essentially spherical, wherein sphericity is defined as above.

The coated polymer particles of the invention can be prepared by various processes, preferably by a suspension coating process or a fluidized bed coating process.

In one aspect, the invention relates to a process for preparing coated polymer particles, comprising the steps of
a) suspending water-swellable polymer core particles in an organic solvent,
b) adding to the suspension a precursor of an oxide, hydroxide or oxide hydrate of silicon, aluminum, zirconium, tin or titanium or mixtures thereof, to allow the reactive precursor to collocate at the particle solvent interphase boundary,
c) converting the precursor to an oxide, hydroxide or oxide hydrate of silicon, aluminum, zirconium, tin or titanium or mixtures thereof, and
d) obtaining a water-swellable polymer core coated with an essentially continuous coating encapsulating the water-swellable polymer,
wherein the steps b) and c) are optionally repeated as many times as required to obtain the desired thickness of the coating (once, twice or for three to ten times).

Suitable organic solvents are, e.g., selected from $C_1$-$C_{12}$-alcohols with one, two or more hydroxy groups; aromatic hydrocarbons such as benzene, toluene, xylene; and aliphatic hydrocarbons (including alicyclic hydrocarbons), preferably aliphatic hydrocarbons with 5 to 14 carbon atoms such as pentane, hexane, octane, cyclohexane and methylcyclohexane. Mixtures of aliphatic and alicyclic $C_7$ to $C_{12}$ hydrocarbons are known as white spirit and are useful organic solvents.

Step a) can involve the in situ preparation of suspended water-swellable polymer core particles by inverse suspension polymerization as explained in more detail above. Additional organic solvent may be added to the suspension as obtained after inverse suspension polymerization. However, the addition of an additional organic solvent is not mandatory.

Alternatively, step a) comprises adding a suitable organic solvent to the water-swellable polymer particles and suspending the water-swellable polymer core particles in the solvent. Adding said organic solvent is particularly relevant, when the water-swellable polymer has been isolated from a suspension/dispersion.

Step b) of the process for preparing coated polymer particles of the invention comprises the addition to the suspension a precursor of an oxide, hydroxide or oxide hydrate of silicon, aluminum, zirconium, tin or titanium or mixtures thereof, to allow the reactive precursor to collocate at the particle solvent interphase boundary. Suitable precursors are defined below.

The precursor is then at least partially converted into an oxide, hydroxide or oxide hydrate of silicon, aluminum, zirconium, tin or titanium or mixtures thereof as explained below.

In one embodiment, step d) includes removing liquid supernatant from the dispersion, washing and drying the coated polymer particles, for example at temperatures of 20 to 60° C. and ambient pressure. Washing of the obtained coated particles may be carried out with a suitable solvent, for example acetone, n-pentane, n-hexane, n-heptane or toluene.

In one embodiment, steps b) and c) are optionally repeated once, twice or for three to ten times, with or without isolating the coated particles from the suspension between the individual repetitions. This repetition procedure results in the formation of coatings with two, three or up to eleven layers.

In another aspect, the invention relates to a process for preparing coated polymer particles, comprising the steps of
(a) fluidizing water-swellable polymer core particles in a stream of a fluidizing gas,
(b) contacting the particles with a solution or dispersion of a precursor of an oxide, hydroxide or oxide hydrate of silicon, aluminum, zirconium, tin or titanium or mixtures thereof, to coat the particles with the reactive precursor,
(c) converting the reactive precursor to an oxide, hydroxide or oxide hydrate of silicon, aluminum, zirconium, tin or titanium or mixtures thereof,
(d) drying the coated particles.

Steps (b) to (d) can be carried out two or more times in order to obtain particles having a thicker coating.

In an embodiment, the drying step (d) is carried out simultaneously with step (b) and/or step (c).

The fluidized bed coating process can be carried out in a conventional apparatus such as those commercially available from Glatt GmbH, Binzen, Germany, or Bosch Huettlin GmbH, Schopfheim, Germany. The conditions are selected such that the temperature of the particles is maintained in the range from 40 to 100° C., in particular 40 to 80° C., i.e. such that the exit temperature of the fluidizing gas (normally air) is in the range from 40 to 80° C. To achieve this the supply gas temperature is, in general, selected in the range from 60 to 200° C., in particular 80 to 140° C., whereas the other parameters will have to be selected depending on the type and size of the apparatus and the batch size.

For feeding the precursor and other reagents, if any, conventional nozzles can be used such as a two-substance nozzle or a three-substance nozzle. The water-swellable polymer core particles are placed into the fluidized bed apparatus and the apparatus is put into operation. As soon as the content of the apparatus has reached the operating temperature and a stable fluidized bed, the precursor solution or dispersion is applied, preferably by spraying.

The coated particles are dried to a water content of 0.5 to 5% by weight.

Suitable precursors useful in the processes described above are compounds that are capable to undergo a polycondensation reaction to form oxides, hydroxides or oxide hydrates of silicon, aluminum, zirconium, tin or titanium or mixtures thereof, optionally after hydrolysis and/or acidification.

Suitable precursors may be selected from
(a) tetra-$C_1$-$C_4$-alkoxysilanes, tri-$C_1$-$C_4$-alkoxy-$C_1$-$C_4$-alkylsilanes, tri-phenyloxy-$C_1$-$C_4$-alkylsilanes, tri-$C_1$-$C_4$-alkoxy-phenyl-silanes, di-$C_1$-$C_4$-alkoxydi-$C_1$-$C_4$-alkylsilanes, di-phenyl-phenyloxy-$C_1$-$C_4$-alkylsilanes, di-$C_1$-$C_4$-alkoxydi-phenyl-silanes; vinyltri-$C_1$-$C_4$-alkoxysilanes, vinyltriphenyloxysilanes, (meth)acryloxy-$C_1$-$C_4$-alkoxytri-$C_1$-$C_4$-alkylsilanes, (meth)acryloxy-$C_1$-$C_4$-alkyltri-$C_1$-$C_4$-alkylsilanes, (meth)acryloxy-$C_1$-$C_4$-alkyldi-$C_1$-$C_4$-alkyl-$C_1$-$C_4$-alkoxysilanes, (meth)acryloxy-$C_1$-$C_4$-alkyl-$C_1$-$C_4$-alkyl-$C_1$-$C_4$-dialkoxysilanes, (meth)acryloxy-$C_1$-$C_4$-alkyltri-$C_1$-$C_4$-alkoxysilanes; or a partially pre-reacted or pre-hydrolyzed product thereof;
(b) halides, $C_1$-$C_4$-alkoxides, carboxylates of aluminum, zirconium, tin or titanium; or a partially pre-reacted or pre-hydrolyzed product thereof;
(c) alkali metal silicates or metasilicates; or a partially pre-reacted or pre-hydrolyzed product thereof;
(d) or mixtures thereof.

In one embodiment, suitable precursors for the coating are selected from tetra-$C_1$-$C_4$-alkoxysilanes, tri-$C_1$-$C_4$-alkoxy-$C_1$-$C_4$-alkylsilanes, tri-phenyloxy-$C_1$-$C_4$-alkylsilanes, tri-$C_1$-$C_4$-alkoxy-phenyl-silanes, di-$C_1$-$C_4$-alkoxydi-$C_1$-$C_4$-alkylsilanes, di-phenyl-phenyloxy-$C_1$-$C_4$-alkylsilanes, di-$C_1$-$C_4$-alkoxydi-phenyl-silanes; halides, $C_1$-$C_4$-alkoxides, carboxylates of aluminum, zirconium, tin or titanium, such as aluminum isopropoxide, zirconium tetrachloride, titanium tetrabutoxide.

Additional suitable precursors are vinyltri-$C_1$-$C_4$-alkoxysilanes, vinyltri-phenyloxysilanes, (meth)acryloxy-$C_1$-$C_4$-alkoxytri-$C_1$-$C_4$-alkylsilanes, (meth)acryloxy-$C_1$-$C_4$-alkyltri-$C_1$-$C_4$-alkylsilanes, (meth)acryloxy-$C_1$-$C_4$-alkyldi-$C_1$-$C_4$-alkyl-$C_1$-$C_4$-alkoxysilanes, (meth)acryloxy-$C_1$-$C_4$-alkyl-$C_1$-$C_4$-alkyl-$C_1$-$C_4$-dialkoxysilanes, or (meth)acryloxy-$C_1$-$C_4$-alkyltri-$C_1$-$C_4$-alkoxysilanes.

Polyols with two or more hydroxyl groups and two to six carbon atoms, such as diethyleneglycol, pentaerytrithol, neopentylglycol, 1,2-hexanediol or 1,6-hexanediol or silicates or metasilicates of alkali metals, such as sodium, may be added to the precursors in an amount 1 to 10 wt. %, based on the weight of the precursor.

The alkoxy-substituents of the above-mentioned precursors may be the same or different for precursors with at least two of them. The alkyl-substituents may be the same or different for precursors with at least two of them.

Among the $C_1$-$C_4$-alkoxy-substituents of the precursors, methoxy, ethoxy and propoxy are preferred. Among the $C_1$-$C_4$-alkyl-substituents of the precursors, methyl, ethyl and propyl are preferred.

It is assumed that the residual moisture present in the water-swellable polymer core particles is sufficient that upon contact of the precursor with the particles, hydrolysis of the precursors occurs, followed by condensation reactions of the hydrolyzed precursors, optionally including condensation with functional groups of the water-swellable polymer core. In this manner, a water-swellable polymer core coated via covalent bonds with an essentially continuous coating encapsulating the water-swellable polymer core is obtained. Of course, additional water can be added as necessary.

Other precursors which are particularly useful in the fluidized bed coating process described above, are alkali metal silicates or metasilicates, or a partially pre-reacted or pre-hydrolyzed product thereof.

Aqueous sodium silicate solutions ($Na_2O.nSiO_3$) or potassium silicate solutions ($K_2O.nSiO_3$), commonly also called water glass, are preferred precursors. The molar ratio $SiO_2/Na_2O$ or $SiO_2/K_2O$, respectively, is called water glass modulus (n) and determines various physical and chemical properties such as the pH and the viscosity of the solution.

Sodium water glass having a modulus of from 2 to 3.5, and a solid contents from 30 to 45 wt. % or potassium water glass having a modulus of from 2 to 3.5, and a solid contents from 30 to 45 wt. % have been found useful.

An acid is added to the precursor to ultimately achieve at least partial conversion to silica. Suitable acids are water-soluble (water-soluble means an acid having a solubility of ≥100 g per 1 L water) inorganic and organic acids having a pKa (at 25° C.) of ≤5. Examples for such acids are hydrochloric acid, hydrobromic acid, sulfuric acid, phosphoric acid, nitric acid, methane sulfonic acid, toluene sulfonic acid, benzene sulfonic acid, formic acid, acetic acid, etc. The concentration of the acid is advantageously ≤1.5 N, in particular ≤1.2 N.

The silica precursor and/or the acid for converting the silica precursor to silica are applied by spraying them onto the water-swellable polymer core particles in the fluidized bed apparatus.

Combining the precursor with acid can advantageously proceed according to the following options:
(1) The total amount of the acid is added to the initial precursor solution. The amount of acid is such that the pH of the solution is still in the alkaline range, i.e. in the range from 8.5 to 9.5. This results in a pre-reacted precursor solution containing a silicate in which the condensation to silica is further advanced but not yet completed. This precursor solution is then applied to the water-swellable polymer core particles, and the condensation to the silica network is completed.
(2) Only a part of the acid is added to the precursor solution prior to the application of the precursor solution to the water-swellable polymer core particles. The amount of acid is such that the pH of the solution is still in the alkaline range, i.e. in the range from 10 to 12. This achieves a partial condensation of the alkali metal silicate which is less advanced relative to the condensation when using the total amount of acid. The precursor solution is then applied to the water-swellable polymer core particles by spraying it into the operating fluidized bed apparatus. A second part of the acid can then be applied simultaneously with or subsequently to the acid-treated precursor solution by spraying it into the operating fluidized bed apparatus.
(3) The unacidified precursor solution is applied to the water-swellable polymer core particles and a solution of the acid are applied by spraying them into the operating fluidized bed apparatus. This includes that the acid is applied at any time after the application of the precursor solution has already begun. In an embodiment, the total amount of the unacidified precursor solution is applied first and the total amount of the acid is applied subsequently and either immediately after the unacidified precursor solution has been applied or after a short period of time. In a further embodiment, the unacidified precursor solution and the acid are applied intermittently beginning with the unacidified precursor solution. Unacidified precursor solution and the acid may be applied immediately after each other or after a specific period of time.

Preferably, the amount of acid used in the process is such that the precursor is in molar excess over the acid. The molar ratio of precursor to acid is in particular 2:1 to 10:1.

The invention further relates to the use of the coated polymer particles as defined above in oil fields, in mining, for construction chemical compositions or as carrier for active substances.

With respect to mining or in oil fields the coated polymer particles of the invention may be useful for absorbing undesired, infiltrating water.

The coated polymer particles of the invention may be used in oil fields, for example in order to prevent so called water coning. Coning is a production problem in which for example bottom water infiltrates the perforation zone in the near wellbore area and reduces oil production. The coated polymer particles of the invention, when introduced to appropriate zones, may be used to absorb said infiltrating water. Sufficient water uptake of the water-swellable polymer cores may start, when the coating has been removed, for example after diffusion of water into the polymer cores ore by increased pressure.

The coated polymer particles of the invention may also be used for controlling the conformance during oil recovery operation. Conformance is a measure of the uniformity of the flood front of the injected drive fluid during an oil recovery flooding operation and the uniformity vertically and areally of the flood front, as it is being propagated through an oil reservoir. Said conformance may negatively be influenced by infiltrating water. Coated polymer particles of the invention may help to block said infiltration channels by water absorption.

The coated polymer particles of the invention may also be used as additives for construction chemical compositions, comprising for example mortar, concrete when a time-delayed water absorption is desired. This may help to perform time delayed rheology switches of construction chemical compositions.

When introduced into concrete compositions, the coated polymer particles of the invention may help to improve freeze/thaw resistance by absorbing water at an appropriate time.

Additionally, the coated polymer particles of the invention may be loaded with crop protection chemicals before encapsulation. After having deposited said loaded particles at a desired area a controlled release of the crop protection chemicals may be initiated by degradation of the coating, for example by diffusion of water into the polymer core.

The following figures and examples are intended to illustrate the invention in greater detail.

EXAMPLE 1

Copolymer 1 (Anionic Superabsorbent Copolymer)

A 2 L double jacketed reactor was charged with 600 g of white spirit D40 (available from Miller Chemie, Germany). After addition of 3 g Span® 80 (sorbitane monooleate, available from Sigma Aldrich, Germany) and a stabilizer (copolymer of alkyl acrylates or methacrylates with acrylic and methacrylic acid) the reactor was purged with nitrogen for 90 min, while the mixture was stirred at a rotation speed of 300 rpm. The monomeric phase was prepared in a separate vessel: Said vessel was charged with water (7.2 g) and 160.81 g (21.97 mol-%) of the sodium salt of 2-acrylamido-2-methylpropanesulfonic acid (50 wt.-% solution in water), 161.29 g (70.99 mol-%) acrylamide (50 wt.-% solution in water), 8.11 g (7.01 mol-%) acrylic acid (99.5 wt.-% concentrated solution) and 4.04 g (0.03 mol-%) methylenebisacrylamide (2.0 wt.-% concentrated solution) were added successively and neutralized with 7.93 g of a 50% sodium hydroxide solution, in order to adjust the pH to a value of 6.0. Additionally 3.60 g of an aqueous 4% V50 solution (2,2'-azobis(2-amidinopropane)dihydrochloride; WAKO Chemicals) and 3.60 g of an aqueous 1% sodium bisulfite solution were added to the aqueous phase. Said aqueous phase was added to the oil phase in the reactor and the oil-water-mixture was dispersed for 2 min at a rotation speed of 300 rpm. The polymerization was initiated by addition of 3.6 g of an aqueous 0.5% solution of tert-butylhydroperoxide. The reaction mixture was stirred for 30 min. Thereafter, water was distilled off azeotropically (620 rpm, 50 mPa, 60° C.). The resulting polymer beads were filtered, washed with acetone and dried at 40° C. for 6 h in a drying chamber.

EXAMPLE 2

Copolymer 2 (Anionic Superabsorbent Copolymer)

Oil phase and aqueous phase were prepared in separate beaker glasses. For the preparation of the oil phase 10.7 g Span® 80 (available from available from Sigma Aldrich, Germany), 35.6 g of a stabilizer (copolymer of alkyl acrylates or methacrylates with acrylic and methacrylic acid) and 295 g white spirit D40 (aliphatic hydrocarbon mixture, available from Miller Chemie, Germany) were mixed. For the preparation of the aqueous phase 191.04 g (22.01 mol-%) of the sodium salt of 2-acrylamido-2-methylpropane sulfonic acid (50 wt.-% solution in water), 191.18 g (70.94 mol-%) acrylamide (50 wt.-% solution in water), 0.2 g Trilon® C (50% solution of diethylentriaminepenta-acetic acid, pentasodium salt, available from BASF SE, Germany), 4.79 g (0.03 mol-%) methylenebisacrylamide (2.0 wt.-% concentrated solution) and 9.63 g (7.02 mol-%) acrylic acid (99.5 wt.-% concentrated solution) were mixed and neutralized with 23.84 g of a 20% sodium hydroxide solution, in order to adjust the pH to a value of 6.0. Afterwards, 5.6 g of water were added to the aqueous phase. Oil phase and aqueous phase were then mixed in one beaker glass and homogenized for 1 min at 10000 rpm. A 2 L double jacketed reactor was then charged with the resulting mixture and adjusted to 15° C. During the adjustment of the temperature the reactor was purged with nitrogen at 300 rpm. The polymerization reaction was initiated by dropwise addition of 0.16 g of an aqueous 0.5% solution of tert-butylhydroperoxide and an aqueous 0.16 g 1.0% solution of $SO_2$. Said addition was controlled in a way that the temperature increase was not exceeding 1° C./min until a maximum reaction temperature of 40° C. The amount of unreacted acrylamide was lowered by addition of azo-bis-(isobutyronitrile) (24 g of 4 wt.-% methanolic solution) at 80° C. and stirring. Thereafter, water was distilled off azeotropically.

EXAMPLE 3

In Situ Coating

A 2 L double jacketed reactor was charged with 600 g of white spirit D40 (available from Möller Chemie, Germany). After addition of Span® 80 (3 g, available from available from Sigma Aldrich, Germany) and a stabilizer (copolymer of alkyl acrylates or methacrylates with acrylic and methacrylic acid) the reactor was purged with nitrogen for 90 min, while the mixture was stirred at a rotation speed of 300 rpm. The monomeric phase was prepared in a separate vessel: Said vessel was charged with water (7.2 g) and 160.81 g (21.97 mol-%) of the sodium salt of 2-acrylamido-2-methylpropanesulfonic acid (50 wt.-% solution in water), 161.29 g (70.99 mol-%) acrylamide (50 wt.-% solution in water), 8.11 g (7.01 mol-%) acrylic acid (99.5 wt.-% concentrated solution) and 4.04 g (0.03 mol-%) methylenebisacrylamide (2.0 wt.-% concentrated solution) were added successively and neutralized with 7.93 g of a 50% sodium hydroxide solution, in order to adjust the pH to a value of 6.0. Additionally, 3.60 g of an aqueous 4% V50 solution (2,2'-azobis(2-amidinopropane)dihydrochloride; WAKO Chemicals) and 3.60 g of an aqueous 1% sodium bisulfite solution were added to the aqueous phase. Said aqueous phase was added to the oil phase in the reactor and the oil-water-mixture was dispersed for 2 min at a rotation speed of 300 rpm. The polymerization was initiated by addition of 3.6 g of an aqueous 0.5% solution of tert-butylhydroperoxide. The reaction mixture was stirred for 30 min. Thereafter, water was distilled off azeotropically (620 rpm, 50 mPa, 60° C.).

Thereafter, 0.85 g of neopentylglycol were added at 20° C. Then $SiCl_4$ (17 mL) was injected and the mixture was stirred at 300 rpm for 12 h. The resulting coated polymer beads were filtered, washed with acetone and dried at 40° C. for 6 h in a drying chamber.

EXAMPLE 4

2-Step Coating

Polymer beads as obtained in Example 1 (5 g) were re-dispersed in a 250 mL three-neck flask by addition of 1.25 g Triton®-X-100 (available from Dow Chemical Company, USA) and 150 mL ethanol. Under slight stirring aluminum isopropoxide (1.25 g) and tetraethoxysilane (0.5 mL) were added. After 12 h of stirring the supernatant was removed and the thus obtained coated polymer beads were washed with ethanol and transferred into a vessel charged with 50 mL of toluene. Then $SiCl_4$ (5 mL) was added. After 5 h of stirring (60° C.) the resulting polymer beads with a double coating were washed with hexane and dried at 30° C.

EXAMPLE 5

3-Step Coating

Polymer beads as obtained in Example 1 (5 g) were re-dispersed in a 250 mL three-neck flask by addition of toluene (50 mL). Under slight stirring aluminum isopropoxide (0.01 g) and $SiCl_4$ (0.5 mL) were added. After 12 h of stirring the supernatant was removed and the thus obtained coated polymer beads were washed with hexane and dried at 30° C. This procedure was repeated twice, in order to obtain polymer beads with three coating layers.

EXAMPLE 6

Water-Retention Tests

Coated polymer particles were prepared according to Example 3 and different thicknesses of the coatings were obtained by different numbers of coating cycle repetition. Separated test tubes were charged with the obtained particles (particle size: 100 to 200 µm, 1 g) and 10 mL of water (Merck Millipore) and the layer thickness was determined. Table 1 shows that increasing layer thickness provides increasing water retention times. Water retention time means that a contact between the water-swellable polymer core and surrounding water is prevented for a measured period of time.

Water retention time measurement: 30 mg of coated particles were charged into a test tube together with 1 mL of water. Test tube was shaken until a gel was formed, indicating cracking of the $SiO_2$ shell followed by swelling of SISA core. The time from shaking the test tube to gel formation which is observed visually is the water retention time.

TABLE 1

| Layer thickness [μm] | Water retention time [min] |
| --- | --- |
| 0.375 | 5 |
| 0.395 | 8 |
| 0.416 | 15 |
| 0.488 | 100 |

Layer thickness of 0.375 μm already provides water retention of 5 min. Increasing the layer thickness to more than 400 μm provides water retention of 15 min (0.416 μm) or even 100 min (0.488 μm).

COMPARATIVE EXAMPLE

A water-swellable polymer core was prepared according to the polymerization procedure of Example 3. However, no coating steps were carried out after the polymerization reaction. The resulting polymer core was purified by filtration, washing and drying. Said non-coated polymer core (layer thickness=0 μm) has been applied for a comparative experiment according to the procedure of Example 6. Said comparative experiment provided a water retention time of less than 1 min.

EXAMPLE 7

Preparation of a Cationic Water-Swellable Polymer by Inverse Suspension Polymerization A 2 L double jacketed reactor was charged with 600 g of white spirit D40. After addition of 3 g Span 80 and 5.0 g of MUV the mixture was purged with nitrogen at a rotation speed of 300 rpm for 90 min. The aqueous monomer phase was prepared in a separate vessel. For this purpose, initially 23.3 g of water were introduced and 152.00 g (28 mol-%) of aqueous DIMAPA Quat solution (60 wt.-% solution in water), 161.30 g (72 mol-%) of acrylamide 50 wt.-% solution in water) and 4 g (0.03 mol-%) of aqueous methylene bisacrylamide solution (2 wt.-% solution in water) were added subsequently and neutralized with 7.93 g of a 50% sodium hydroxide solution, in order to adjust a pH of 6. Additionally, 3.60 g of an aqueous 4% V50 solution and 3.60 g of an aqueous 1% sodium bisulfite solution were added to the aqueous phase. This aqueous solution was combined with the oil phase in the reactor and the oil/water mixture was dispersed at a rotation speed of 300 rpm for 2 min. The polymerization was initiated by addition of 3.6 g of an aqueous 0.5% tert.-butyl hydroperoxide solution. The batch was stirred for 30 min. Subsequently, the water was azeotropically distilled off at 620 rpm, 50 mPa and 60° C. The polymer beads were filtered, washed with acetone and dried at 40° C. in a drying chamber for 6 hours.

EXAMPLE 8

Preparation of Coated Polymer Particles by a Fluidized Bed Coating Process

Water-swellable polymer particles containing 45.0% by weight of 2-acrylamido-2-methylpropanesulfonic acid, 5.0% by weight of acrylic acid, 49.9% by weight of acrylamide, and 0.2% by weight of methylenebisacrylamide were used.

The following water glasses were used: Sodium water glass containing 8.8% $Na_2O$, 28% $SiO_2$ and 63.2 $H_2O$; modulus 3.4; solids content 38.2%; Potassium water glass containing 12.5% $K_2O$, 26.7% $SiO_2$ and 60.8% by weight $H_2O$; modulus 3.35; solids content 39.2%.

The silica precursor solution was prepared by diluting the above mentioned water glass solutions with water (3 parts water glass, 1 part water). Afterwards, 62.5 wt % of a 0.5 M hydrochloric acid solution (compared to the amount of the formerly prepared solution) were carefully added.

Figure 1:
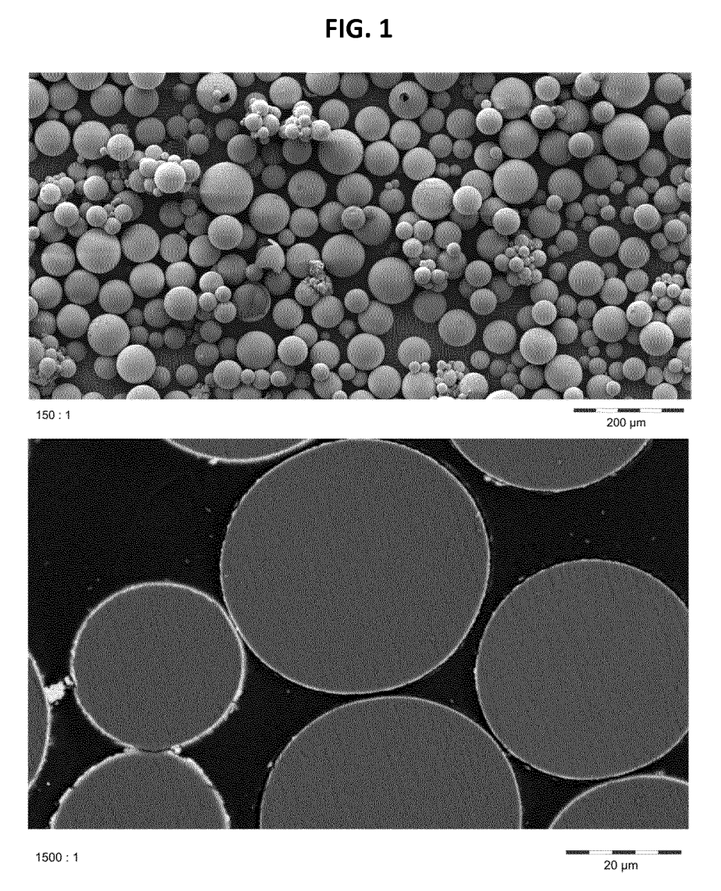
FIG. 1 shows two electron microscopy pictures of coated polymer particles according to the invention, obtained by a suspension coating process. The picture on top shows coated particles as a whole, the picture at the bottom shows a cross-section through said particles and illustrates the continuous coating of the polymer core.
Figure 2:
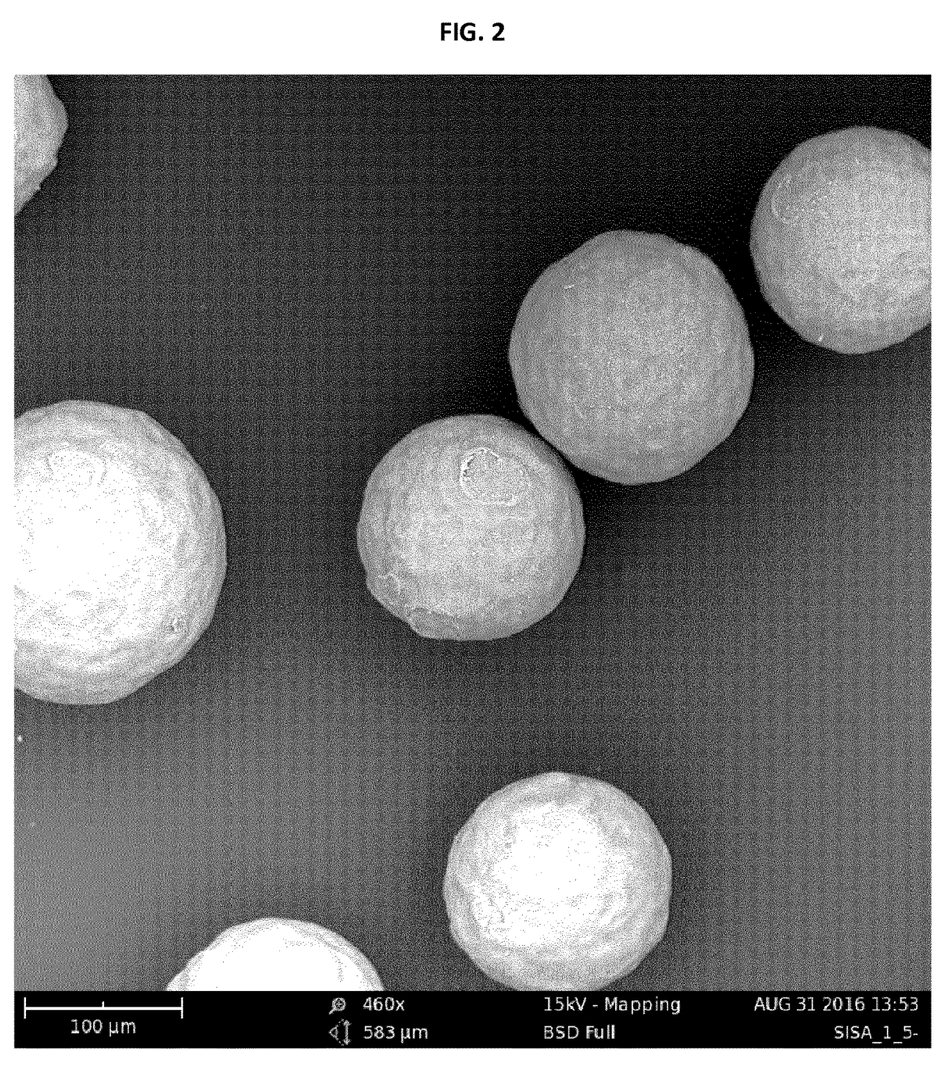
FIG. 2 shows an electron microscopy picture of the coated polymer particles of example 8.

The water-swellable polymer particles (445 g) were placed into a fluidized bed apparatus (Co. Bosch Huetlin, Type Unilab 1) in which the particles were heated to 80° C. The silica precursor solution was then sprayed onto the particles (air inlet temperature: 80° C.; outlet temperature: 60° C.; gas volume: 160 m³/h; micro climate 0.12 bar; nozzle pressure: 0.55 bar). In total, 1300 g of the silica precursor were sprayed onto 445 g of the particles. Finally, silicate coated SISA particles were obtained.

EXAMPLE 9

Figure 3:
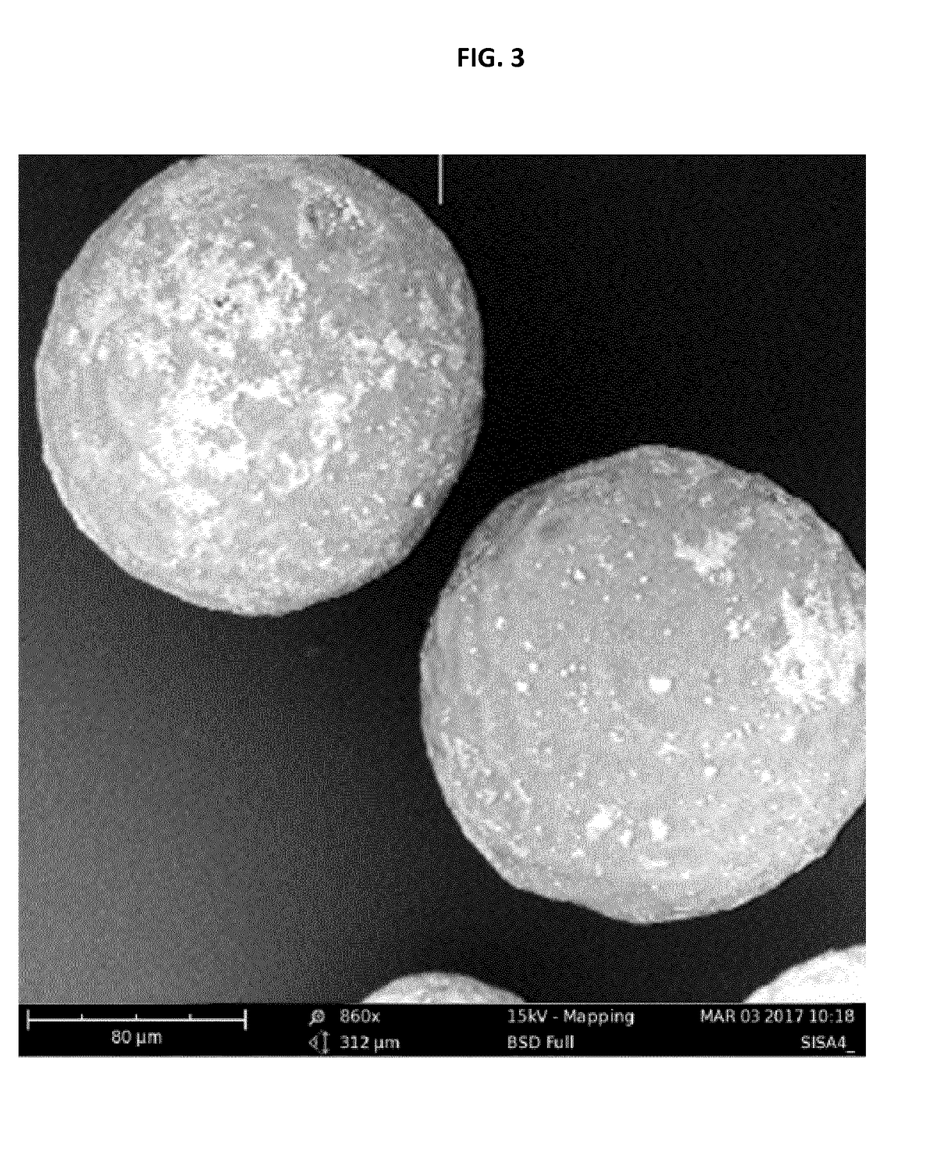
FIG. 3 shows an electron microscopy picture of the coated polymer particles of example 9.

Water-swellable polymer particles as used in Example 8 (450 g) were placed into a fluidized bed apparatus (Co. Bosch Huetlin, Type Unilab 1) in which the particles were heated to 80° C. A silica precursor solution as used in Example 8 was then sprayed onto the particles (air inlet temperature: 80° C.; outlet temperature: 55° C.; gas volume: 160 m³/h; micro climate 0.15 bar; nozzle pressure: 0.55 bar). In total, 1300 g of the silica precursor were sprayed onto 450 g of the particles. After spraying of additionally 200 mL of water for homogenization and cleaning of the nozzles and tubbing, 500 mL of a 1 M hydrochloric acid was sprayed onto the particle at the same rate than before. Finally, silica coated water-swellable polymer particles were obtained.

The invention claimed is:
1. Coated polymer particles comprising
 (a) a water-swellable polymer core comprising a copolymer comprising sulfo group- and/or quaternary ammonium group-comprising structural units; and
 (b) an essentially continuous coating encapsulating the water-swellable polymer core, the essentially continuous coating comprising an oxide, hydroxide or oxide hydrate of silicon, aluminum, zirconium, tin, titanium or a mixture thereof,
 wherein a mass ratio of the oxide, hydroxide or oxide hydrate to the water-swellable polymer core is from 0.002 to less than 1.
2. The coated polymer particles of claim 1, wherein the water-swellable polymer core comprises a copolymer P1 and/or a copolymer P2,
 wherein the copolymer P1 comprises sulfo group- and amide group-comprising structural units, and
 the copolymer P2 comprises quaternary ammonium group- and amide group-comprising structural units.

3. The coated polymer particles of claim 2, wherein the copolymer P1 comprises
(i) sulfonic acid-comprising structural units of formula (I)

(I)

wherein $R^1$ represents hydrogen or methyl,
$R^2$, $R^3$ and $R^4$ each independently represent hydrogen, a $C_1$-$C_6$-alkyl group or a $C_6$-$C_{14}$-aryl group,
M represents hydrogen, a metal cation or an ammonium cation, wherein the metal cation has a valency V, and a represents 1 or 1/V,
(ii) (meth)acrylamido-containing structural units of formula (II)

(II)

wherein $R^1$ represents hydrogen or methyl, and
$R^5$ and $R^6$ each independently represent hydrogen, a $C_1$-$C_{20}$-alkyl group, a $C_5$-$C_8$-cycloalkyl group or a $C_6$-$C_{14}$-aryl group,
(iii) structural units derived from monomers having two or more ethylenically unsaturated vinyl groups, and
(iv) optional structural units derived from monomers having one ethylenically unsaturated vinyl group, wherein the optional structural units are different from the structural units of (i) and (ii), and
wherein the copolymer P2 comprises
(i) cationic structural units of formula (III)

(III)

wherein $R^1$ represents hydrogen or methyl,
$R^7$, $R^8$, $R^9$ and $R^{10}$ each independently represent hydrogen, a $C_1$-$C_{20}$alkyl group, a $C_5$-$C_8$-cycloalkyl group or a $C_6$-$C_{14}$-aryl group,
m represents an integer of 1 to 6,
X represents oxygen or an N—$R^{10}$ group,
$Y^{-a}$ represents halogen, a $C_1$-$C_4$-alkylsulfate group, a $C_1$-$C_4$-alkylsulfonate group or sulfate, and
a represents ½ or 1, (ii) (meth)acrylamido-containing structural units of formula (II)

(II)

wherein $R^1$ represents hydrogen or methyl, and
$R^5$ and $R^6$ each independently represent hydrogen, a $C_1$-$C_6$-alkyl group or a $C_6$-$C_{14}$-aryl group,
(iii) structural units derived from monomers having two or more ethylenically unsaturated vinyl groups, and
(iv) optional structural units derived from monomers having one ethylenically unsaturated vinyl group, wherein the optional structural units are different from the structural units of (i) and (ii).

4. The coated polymer particles of claim 3, wherein the copolymer P1 comprises
(i) 10 to 70 mol-% of structural units of formula (I),
(ii) 29.99 to 89.99 mol-% of structural units of formula (II),
(iii) 0.01 to 1 mol-% of structural units derived from monomers having two or more ethylenically unsaturated vinyl groups, and
(iv) 0 to 30 mol-% of structural units derived from monomers having one ethylenically unsaturated vinyl group,
wherein the mol-% of (i), (ii), (iii) and (iv) add up to 100 mol-%, and
the copolymer P2 comprises
(i) 10 to 70 mol-% of structural units of formula (III),
(ii) 29.99 to 89.99 mol-% of structural units of formula (II),
(iii) 0.01 to 1 mol-% of structural units derived from monomers having two or more ethylenically unsaturated vinyl groups, and
(iv) 0 to 30 mol-% of structural units derived from monomers having one ethylenically unsaturated vinyl group,
wherein the mol-% of (i), (ii), (iii) and (iv) add up to 100 mol-%.

5. The coated polymer particles of claim 2, wherein the water-swellable polymer core comprises a mixture of the copolymers P1 and P2 in a molar ratio of 99/1 to 85/15.

6. The coated polymer particles of claim 1, wherein a number average diameter of the coated polymer particles is in a range of 10 to 1000 μm.

7. The coated polymer particles of claim 1, wherein an average layer thickness of the essentially continuous coating is in a range of 100 to 1000 nm.

8. The coated polymer particles of claim 1, wherein the coated polymer particles have an average sphericity (mSPHT) of at least 0.90.

9. The coated polymer particles of claim 1, wherein the essentially continuous coating comprises an oxide or oxide hydrate of silicon, aluminum, zirconium, tin, titanium or a mixture thereof.

10. The coated polymer particles of claim 9, wherein the essentially continuous coating comprises an oxide of silicon, aluminum, zirconium or a mixture thereof.

11. The coated polymer particles of claim 1, wherein the coated polymer particles comprise an active substance.

12. The coated polymer particles of claim 2, wherein the water-swellable polymer core comprises a mixture of the copolymers P1 and P2 in a molar ratio of 1/99 to 15/85.

13. The coated polymer particles of claim 1, wherein the essentially continuous coating is grown on the water-swellable polymer cores via polycondensation of a condensable precursor or a hydrolysable and condensable precursor.

14. A process for preparing the coated polymer particles of claim 1, the process comprising
 (a) suspending water-swellable polymer core particles in an organic solvent to obtain a suspension,
 (b) adding a precursor of an oxide, hydroxide or oxide hydrate of silicon, aluminum, zirconium, tin, titanium or a mixture thereof to the suspension, wherein the precursor collocates at a particle solvent interphase boundary,
 (c) convening the precursor to an oxide, hydroxide or oxide hydrate of silicon, aluminum, zirconium, tin, titanium or a mixture, and
 (d) obtaining a water-swellable polymer core coated with an essentially continuous coating encapsulating the water-swellable polymer core,
 wherein (b) and (c) are optionally repeated once, twice or three to ten times.

15. The process of claim 14, wherein the organic solvent is selected from the group consisting of a $C_1$-$C_{12}$-alcohol, an aromatic hydrocarbon, an aliphatic hydrocarbon and a mixture thereof, wherein the $C_1$-$C_12$-alcohol has one, two or more than two hydroxy groups.

16. A process for preparing the coated polymer particles of claim 1, the process comprising
 (a) fluidizing water-swellable polymer core particles in a stream of a fluidizing gas,
 (b) contacting the water-swellable polymer core particles with a solution or dispersion of a precursor of an oxide, hydroxide or oxide hydrate of silicon, aluminum, zirconium, tin, titanium or a mixture thereof, to coat the water-swellable polymer core particles with the precursor,
 (c) converting the precursor to an oxide, hydroxide or oxide hydrate of silicon, aluminum, zirconium, tin, titanium or a mixture thereof to obtain coated particles, and
 (d) drying the coated particles.

17. The process of claim 14, wherein the precursor is selected from
 (a) a tetra-$C_1$-$C_4$-alkoxysilane, a tri-$C_1$-$C_4$-alkoxy-$C_1$-$C_4$-alkylsilane, a tri-phenyloxy-$C_1$-$C_4$-alkylsilane, a tri-$C_1$-$C_4$-alkoxy-phenyl-silane, a di-$C_1$-$C_4$-alkoxydi-$C_1$-$C_4$-alkylsilane, a di-phenyl-phenyloxy-$C_1$-$C_4$-alkylsilane, a di-$C_1$-$C_4$-alkoxydi-phenyl-silane, a vinyltri-$C_1$-$C_4$-alkoxysilane, a vinyltriphenyloxysilane, a (meth)acryloxy-$C_1$-$C_4$-alkoxytri-$C_1$-$C_4$-alkylsilane, a (meth)acryloxy-$C_1$-$C_4$-alkyltri-$C_1$-$C_4$-alkylsilane, a (meth)acryloxy-$C_1$-$C_4$-alkyldi-$C_1$-$C_4$-alkyl-$C_1$-$C_4$-alkoxysilane, a (meth)acryloxy-$C_1$-$C_4$-alkyl-$C_1$-$C_4$-alkyl-$C_1$-$C_4$-dialkoxysilane, a (meth)acryloxy-$C_1$-$C_4$-alkyltri-$C_1$-$C_4$-alkoxysilane, and a partially pre-reacted or pre-hydrolyzed product thereof; a halide, a $C_1$-$C_4$-alkoxide, a carboxylate of aluminum, zirconium, tin or titanium; and a partially pre-reacted or pre-hydrolyzed product thereof;
 (b) an alkali metal silicate or metasilicate; and a partially pre-reacted or pre-hydrolyzed product thereof; and
 (c) a mixture thereof.

18. The process of claim 14, wherein (c) comprises:
 (i) hydrolyzing and/or acidifying the precursor to obtain an activated precursor, and
 (ii) subjecting the activated precursor to a polycondensation reaction.

19. A chemical composition suitable for an oil field application, a mining application or a construction application, wherein the chemical composition comprises the coated polymer particles of claim 1.

* * * * *